United States Patent [19]

Miura et al.

[11] Patent Number: 5,730,553
[45] Date of Patent: Mar. 24, 1998

[54] CARRIAGE MOVABLE IN WATER

[75] Inventors: Yuichi Miura, Funabashi; Naoya Hirose, Yokohama; Katsumi Kai, Mitaka, all of Japan

[73] Assignee: Ishikawajima Hirima Heavy Industries Co. Ltd., Tokyo, Japan

[21] Appl. No.: 576,063

[22] Filed: Dec. 21, 1995

[30] Foreign Application Priority Data

Dec. 22, 1994 [JP] Japan ..................... 6-319972

[51] Int. Cl.$^6$ ......................................... B63C 11/10
[52] U.S. Cl. ............... 405/191; 114/222; 15/1.7; 405/188; 405/190
[58] Field of Search ................ 405/185, 188–194; 114/222, 312, 313; 15/1.7

[56] References Cited

U.S. PATENT DOCUMENTS

| | | | |
|---|---|---|---|
| 4,697,536 | 10/1987 | Hirata | 114/222 |
| 4,890,567 | 1/1990 | Caduff | 114/222 |
| 5,014,803 | 5/1991 | Urakami | 114/222 X |
| 5,048,445 | 9/1991 | Lever et al. | 114/222 |
| 5,174,222 | 12/1992 | Rogers | 114/222 |
| 5,384,928 | 1/1995 | Khoury | 15/1.7 |

FOREIGN PATENT DOCUMENTS

| | | | |
|---|---|---|---|
| 0104483 | 6/1982 | Japan | 114/222 |
| 0179391 | 9/1985 | Japan | 114/222 |
| 379323 | 8/1991 | Japan . | |
| 419787 | 2/1992 | Japan . | |

*Primary Examiner*—Dennis L. Taylor
*Attorney, Agent, or Firm*—Barnes, Kisselle, Raisch, Choate, Whittemore & Hulbert, P.C.

[57] ABSTRACT

A carriage movable in waste including: a body having a float at its upper portion and a weight at its lower portion to suspend in the water, the body having an opening in its abdomen; a thrust fan provided on a back of the body, the fan being rotatable in a normal or reverse direction thereby enabling the body to translate in the water and to suctionally attach itself onto a wall or leave the wall; a skirt provided around the opening formed in the abdomen of the body to contact the wall thereby maintaining the bodies interior to a negative pressure as the body suctionally attaches itself onto the wall; and a drive wheel provided on the abdomen of the body to contact the wall upon suctional attachment on the wall. This underwater carriage can move on a vertical wall, have small dimensions and be lightweight.

6 Claims, 4 Drawing Sheets

CARRIAGE MOVABLE IN WATER

BACKGROUND OF THE INVENTION

1. Technical Field

The present invention relates to a carriage movable in water used for inner surface inspection of a pressure vessel of a nuclear reactor, cleaning of a screw propeller of a ship and the like.

2. Background Art

Between a power plant such as a thermal power electric plant and the sea, generally provided is a relatively long channel for intaking and discharging cooling water from and to the sea. Various shells and seaweeds adhere in the channel. In order to sweep such marine organisms, developed is a movable-in-water carriage or underwater carriage which can travel along the channel.

As an example of such underwater carriages, known is the one shown in FIGS. 4A and 4B of the accompanying drawings (Japanese Utility Model Application, publication No. 3-79323). As illustrated, a underwater carriage "a" includes a main body "f", thrust fans "b" and drive wheels "c". Upon rotation of the thrust fans "b", the main body "f" is pressed against a channel "d" by jets (unshaded arrows). Then, as the drive wheels "c" rotate, the carriage "a" moves on the waterway "d".

However, if the carriage "a" must move on a vertical wall, thrust of the thrust fans "b" should be increased considerably to press the carriage "a" against the vertical wall and provide the drive wheels "e" with a proper contact pressure. In this case, a motor "m" of the thrust fan "b" should be designed in a larger size or the number of the motors should be increased. This makes the carriage larger and heavier.

SUMMARY OF THE INVENTION

One object of the present invention is to provide a underwater carriage which can move on a vertical wall.

Another object of the present invention is to provide a compact and lightweight underwater carriage.

According to one aspect of the present invention, there is provided a underwater carriage which comprises a body having a float at its upper portion and a weight at its lower portion to suspend in the water and further having an opening in its abdomen, a thrust fan mounted on a back of the body to be able to rotate in a normal or reverse direction such that the carriage can translate in the water and suctionally attach itself onto and leave a wall, a skirt provided along the periphery of the opening formed in the bodies abdomen for contacting the wall and maintaining the bodies interior to a negative pressure when the body suctionally attaches itself on the wall and drive wheels mounted on the bodies abdomen to contact the wall upon suctional attachment onto the wall. The underwater carriage is suspended in the water in an upright posture due to the float provided at its upper portion and the weight provided at its lower portion. Upon normal or reversal rotation of the thrust fan, therefore, the carriage performs a translation motion in the water in its abdomen direction or back direction with its upright posture being maintained. As the skirt provided around the opening of the abdomen reaches the wall under the water, it maintains the bodies interior to a negative pressure so that the carriage suctionally attaches itself onto the wall. At this point, the drive wheels mounted on the bodies abdomen contact the wall. Therefore, rotation of the drive wheels thereafter causes the underwater carriage to travel on the wall. Although the underwater carriage of the present invention is compact and lightweight and has a simple structure, it is capable of translating in the water and traveling on the wall after suctional attachment onto the wall.

It should be noted that two thrust fans may be provided at right and left portions of the back of the carriage body respectively. By applying different rotational speeds to the right and left thrust fans, the underwater carriage can make a curving movement in the water while keeping its unstraight attitude.

It should also be noted that the drive wheels may be provided at right and left lower portions of the abdomen of the body respectively. The location of the drive wheels is close to the center of gravity of the upright carriage so that better traction can be expected upon contact with the wall. By rotating the right and left drive wheels at different speeds, the underwater carriage can travel in a curved way on the wall.

A power supply cable may be connected with the carriage body, which cable also serves as a manipulation cable for controlling vertical movement in the water. By manipulating the power supply cable from the above, it is possible to vertically relocate the underwater carriage suspended in the upright position in the water.

A ball caster may be mounted on the abdomen of the carriage body to assist the drive wheel moving on the wall. With the ball caster, the curving movement of the carriage on the wall is stabilized.

BRIEF DESCRIPTION OF THE ACCOMPANYING DRAWINGS

DETAILED DESCRIPTION OF THE PREFERRED EMBODIMENTS

Now, one embodiment of the present invention will be described with reference to FIGS. 1 to 3.

Figure 1:
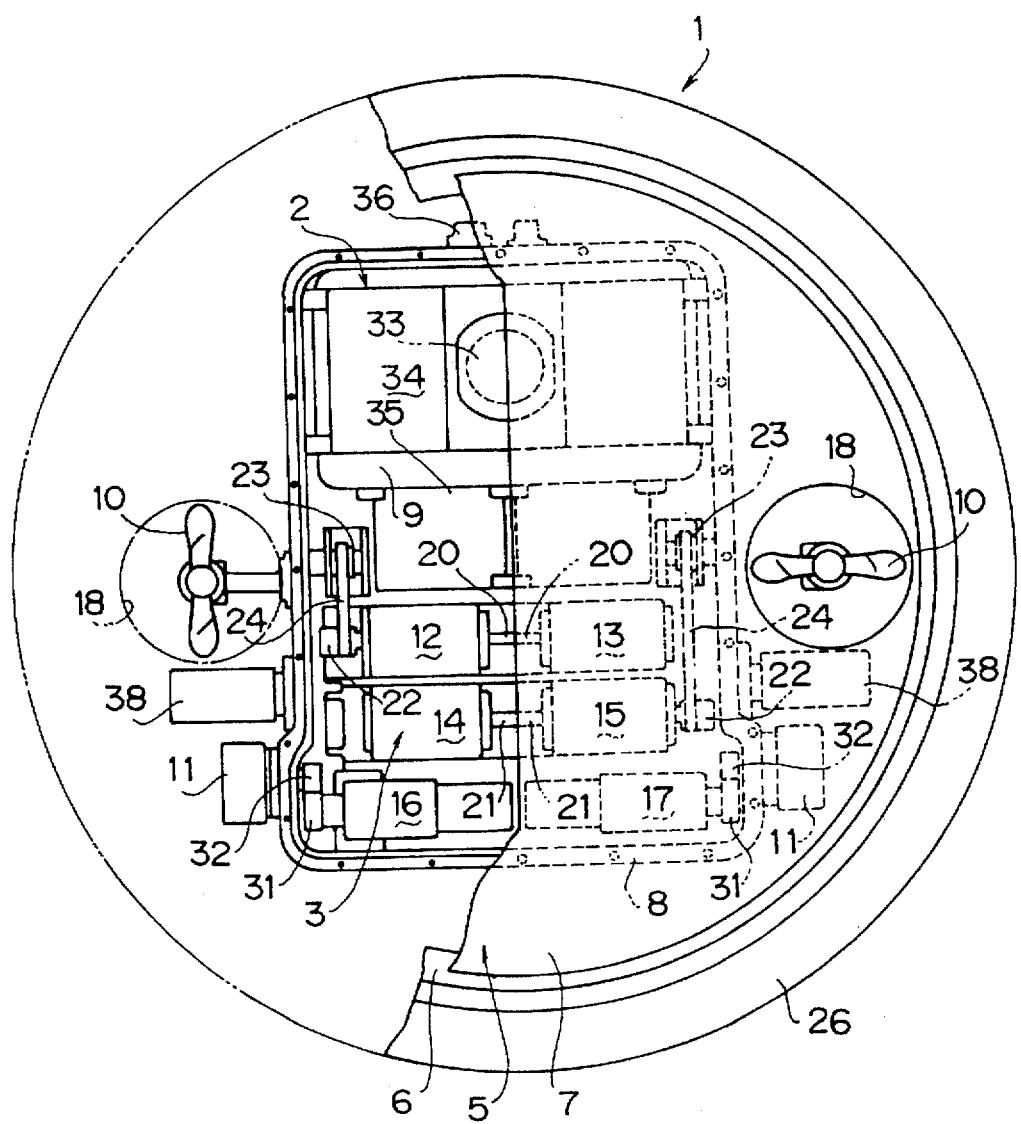
FIG. 1 shows a partly sectioned plan view of a underwater carriage according to one embodiment of the present invention.
Figure 2:
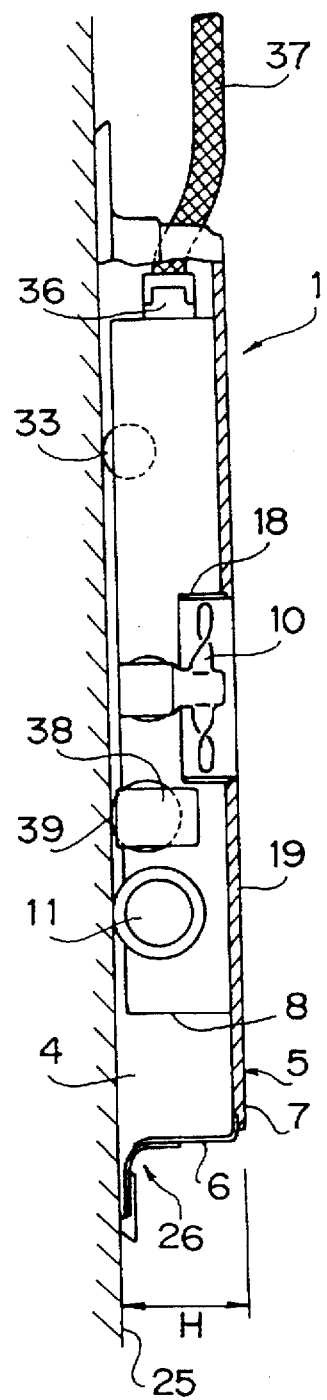
FIG. 2 illustrates a lateral sectional view of the underwater carriage when the carriage suctionally attaches itself to the wall.

Referring to FIG. 1, a underwater carriage 1 includes a body 5 having a float 2 at its upper portion and a weight 3 at its lower portion to suspend itself in an upright posture in the water and further having an opening in its abdomen 4 (FIG. 2). The body 5 has a cylindrical member 6 having a small height H as compared with a diameter, a disk 7 closing one side of the cylindrical member 6 and opening the other side thereof, a cover 8 watertightly attached to an inner surface of the disk 7, and the float 2 and weight 3 respectively provided at the upper and lower positions inside the cover 8.

The float 2 is made from a closed tank 9 filled with air or styrene foam, and the weight 8 is comprised of motors 12–17 to drive thrust fans 10 and drive wheels 11 (will be described later). The tank 9 is located at an upper position in the cover 8 and the motors 12–17 are located at lower positions in the cover 8. Floating manner of the carriage body 5 in the water is adjusted by the tank 9 and the motors 12–17 in a such way that the carriage body 5 is suspended in an upright posture in the water. Specifically, the suspension manner is adjusted such that the carriage body 5 is slightly immersed in the water.

The thrust fans 10 are provided in right and left ducts 18 formed in the disk 7: the two thrust fans are situated right and left of the cover 8 respectively. In other words, each thrust fan 10 is provided on the back 19 side of the carriage body 5. With this construction, normal and reverse rotation of the thrust fans 10 cause the carriage body 5 to translate in its back 19 direction or abdomen 4 direction (right or left direction in FIG. 2) in the water while keeping the uprightly suspended posture. The left thrust fan 10 is driven by the motors 12 and 13 and the right thrust fan 10 is driven by tile motors 14 and 15. Each of the motors 12–15 is controlled to have the constant current so that the larger tile load, the slower the rotational speed whereas the smaller the load, the faster the rotational speed.

The motors 12–15 are arranged to define a square parallel to the disk 7. The motors 12 and 13 are lined up and rotational shafts 20 of these motors 12 and 13 are joined with each other. Likewise, the motors 14 and 15 are lined up and rotational shafts 21 of these motors 14 and 15 are connected with each other. According to this construction, in is possible to raise the thrust of the thrust fan 10 while restricting the height H of the carriage 1 (FIG. 2). The motors 12 and 13 for the left thrust fan and the motors 14 and 15 for the right thrust fan are adapted to be independently controlled on rotational speed and rotational direction.

The shafts of the fan motor 12 and 15 have stepped pulleys 22 respectively. Each stepped pulley 22 is driven with another stepped pulley 23 mounted on a drive shaft of the right or left thrust fan 10 by a stepped belt 24. With this construction, the left thrust fan 10 is driven by the motors 12 and 13 and the right thrust fan 10 is driven by the motors 14 and 15. Therefore, by controlling the rotational speed and rotational direction of the motors 12–15 to appropriately change the rotational speed and the rotational direction of the right and left thrust fans 10, it is possible to translate the carriage body 5 in its back 19 direction or abdomen 4 direction linearly or nonlinearly while keeping the body suspended in the upright posture in the water.

Referring to FIG. 2, a skirt 26 is provided around the periphery of the opening of the cylindrical member 6, i.e., around the opening formed in the carriage abdomen 4, to contact the wall 25 and maintain the interior of the carriage body 5 to a negative pressure when the carriage body 5 is translated in its upright posture and the abdomen 4 abuts onto the wall 25 in the water. As illustrated in FIG. 3, the skirt 26 includes a flare ring 27 mounted along the periphery of the opening of the cylindrical member 6 and made from a flexible material such as rubber and an outer collar 28 attached to an outer free edge of the flare ring 27 and made from a material such as resin.

Figure 3:
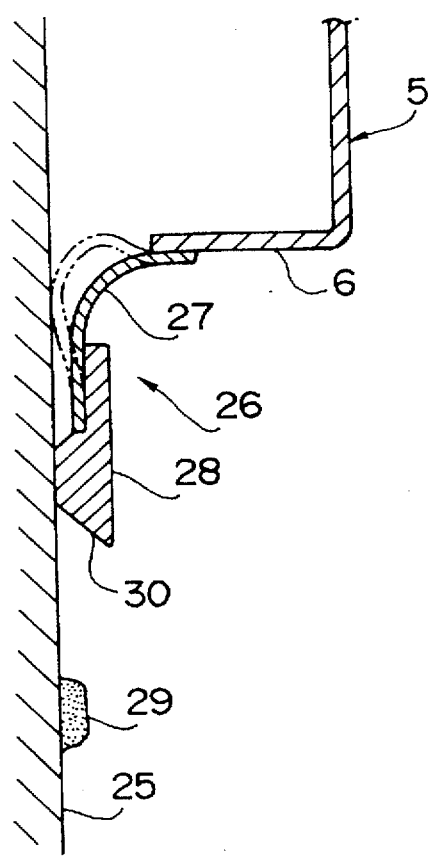
FIG. 3 illustrates an enlarged view of part of FIG. 2.
Figure 4A:
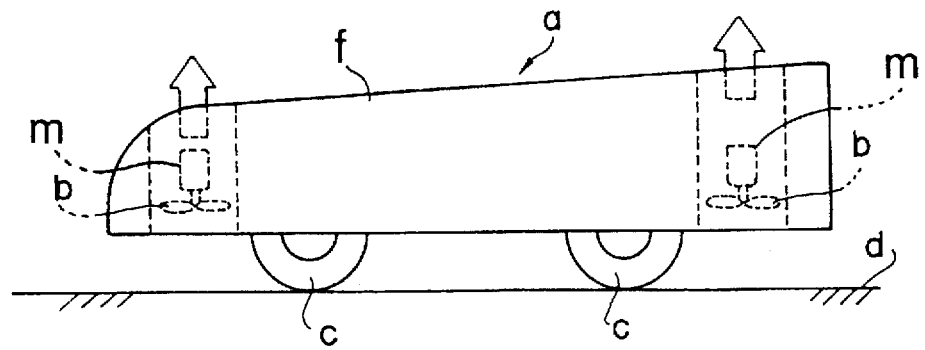
FIG. 4A illustrates a lateral view of a conventional underwater carriage.
Figure 4B:
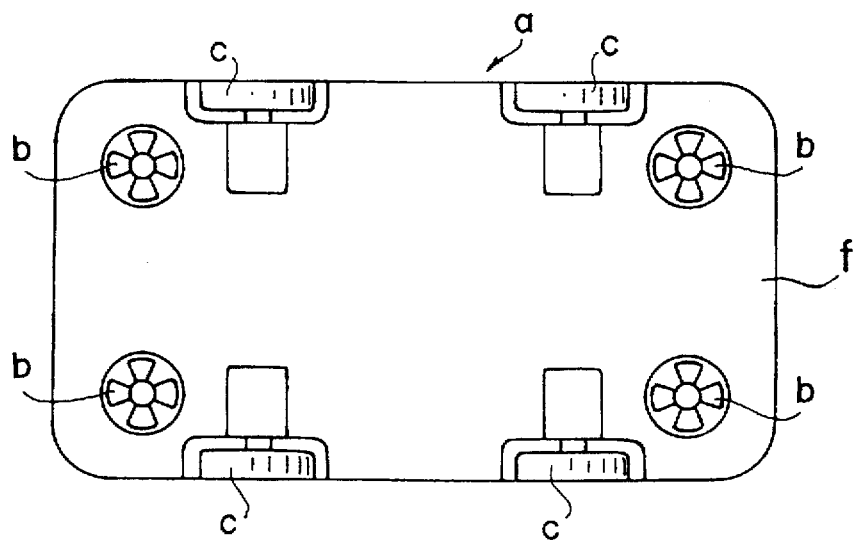
FIG. 4B depicts a plan view of the underwater carriage shown in FIG. 4A.

As the interior pressure of the carriage body 5 becomes negative, an attraction force caused by the negative pressure pulls the flare ring 27 inward and deforms it as indicated by the two-dash line in FIG. 3 thereby forcing it to contact the wall 25. At this point, however, it should be noted that the flare ring 27 does not completely watertight-seal the carriage body 5 but allows some water flow from the outside to the inside of the carriage body 5 between itself and the wall 25. Therefore, the interior pressure of the carriage body 5 does not become a complete vacuum nor the carriage body is completely fixed on the wall 25. An inclined surface 30 is formed at the free edge of the outer collar 28 to override obstructions 29 adhering on the wall 25 such as wastes and bolts.

Referring again to FIG. 1, the drive wheels 11 are provided right and left off the cover 8 such that they contact the wall 25 when the carriage body 5 suctionally attaches itself onto the wall 25 (FIG. 2). The drive wheels 11 are driven by the drive wheel motors 16 and 17 housed in the cover 8 respectively. The drive wheel motors 16 and 17 are located in the vicinity of the fan motors 14 and 15 respectively. A shaft of each drive wheel motor 16, 17 has a pinion 31. The pinion 31 engages with a pinion 32 mounted on a drive shaft of each drive wheel 11.

The right and left drive wheel motors 16 and 17 are dependently controllable on rotational speed and rotational direction. According to this construction, by forcing the carriage body 5 to suctionally attach itself onto the wall 25 and then controlling the rotational speed and direction of the right and left drive wheel motors 16 and 17 to independently control the right and left drive wheels 11, it is possible to move the carriage on the wall 25 straightly or curvedly as desired.

The drive wheels 11 are positioned at a lower part of the abdomen 4 of the upright carriage body (FIG. 2). Accordingly, the location of the drive wheels 11 is close to the center of gravity of the upright carriage body 5 so that traction upon contact with the wall 25 is improved. As a result, idle rotation of the drive wheels 11 is restricted. In addition, a ball caster 33 is provided at an upper part of the cover 8 (FIG. 2). The ball caster 33 is adapted to steer in accordance with curving movement of the carriage body 5.

Various substrates 34 and a controller 35 for the motors 12–17 are provided at an upper location in the casing 8. A connector 36 is provided at an upper part of the easing 8. A power supply and control signal cable 37 (power transfer cable) is connected with the connector 36 (FIG. 2). The power supply cable 37 also serves as an operation cable to manipulate vertical (up and down direction in FIG. 2) movement of the carriage body 5 suspended in the water in the upright posture.

Planimeters 38 are provided at lateral sides of the casing 8 respectively to detect a travel distance on the wall 25. Each planimeter 38 is associated with a friction roller 39 which rolls on the wall 25 as the carriage body 5 moves on the wall (FIG. 2) and a rotary encoder for counting the number of rotations of the friction roller 39 (not shown).

Now, operations of the underwater carriage 1 will be described.

The underwater carriage 1 has the tank 9 (i.e., the float 2) at an upper position in the cover 8 and the motors 12–17 (i.e., the weight 3) at a lower position in the cover 8 so that it is suspended in the upright posture in the water. Therefore, if the thrust fans 10 are rotated in a normal or reverse direction, the underwater carriage 1 translates in its abdomen 4 direction or back 19 direction while taking the upright posture in the water.

By applying different rotational speeds to the right and left thrust fans 10, the underwater carriage 1 can curvedly translate in the upright posture in the water. By rotating the right and left thrust fans 10 in opposite directions, the underwater carriage 1 can rotate about its axis in the water while assuming the upright attitude. By manipulating the power supply and manipuation cable 37 connected to the carriage body 5 from the above, the underwater carriage 1 can move in the vertical direction in the water in the upright attitude.

Through the above operations, an operator makes the underwater carriage 1 approach the wall 25 with its abdomen 4 facing the under-the-water wall 25. Then, as illustrated in FIG. 2, the operator forces the skirt 26 provided around the opening of the abdomen 4 of the carriage 1 to contact the under-the-water wall 25. Accordingly, the interior of the carriage body 5 has a negative pressure and an attraction force produced by the negative pressure imposes the flare ring 27 of the skirt 26 to be pulled inward and distorted as indicated by the two-dash line in FIG. 3. Consequently, the interior of the carriage body 5 is maintained to a negative pressure and the underwater carriage 1 suctionally attaches itself on the wall 25.

Since the skirt 26 has a large area enough to seal the carriage body 5, even a small negative pressure per unit area can provide a sufficiently large attachment Force as a whole. Therefore, it is possible to reduce the output of the drive motors 12–15 of the thrust fans 10 and in turn dimensions thereof. The skirt 26 does not provide completely watertight sealing between the wall 25 and the carriage: rather it allows water flow from the outside to the inside of the carriage body 5 between itself and the wall 25. Therefore, the thrust fans 10 are rotated in a manner to discharge this incoming water and another water which is necessary to keep the negative pressure.

Upon suctional attachment onto the wall, the drive wheels 11 provided at the abdomen 4 of the carriage body contact the wall 25. After that, the underwater carriage 1 moves on the wall 25 by rotating the drive wheels 25. It should noted here that a friction between the skirt 26 and the wall 25 is small since there is a water flow therebetween so that the drive wheels 11 are able to easily move on the wall 25. Accordingly, relatively small motors are sufficient as the drive wheel motors 16 and 17.

Since the drive wheels 11 are located at the lower part of the abdomen 4 of the upright carriage body, their location is close to the center of gravity of the carriage. Thus, the traction upon contact with the wall 25 is improved. This prevents the idle rotation of the drive wheels 11. It is feasible to move the underwater carriage 1 in a curved way on the wall 25 by applying different speeds to the right and left drive wheels 11. By detecting the travel distance on the wall 25 by the planimeters 38 during this movement, more precise positioning is realized. Further, since the carriage 1 has a small height H, it can proceed into a small clearance.

Even if there are obstructions 29 on the wall 25 such as wastes and bolts as illustrated in FIG. 3, the underwater carriage 1 is capable of easily riding over such obstructions by using the inclined surface 30 formed at the outer collar 28 of the skirt 26. During this movement, the sealing of the carriage body 5 is degraded to a certain extent and a water flow from the outside to the inside (referred to as "leaking flow") increases, but the current applied to the drive motors 12–15 of the thrust motors 10 is controlled to be constant so that the interior of the carriage body 5 is kept to a substantially constant negative pressure. Specifically, if a larger leaking flow comes in, a load on the drive motors 12–15 decreases and these drive motors have increased speed whereas if a smaller leaking flow comes in, the load becomes greater and the drive motors have reduced speed. As a result, it is possible to allow the carriage body 5 to have a substantially constant negative pressure.

What is claimed is:

1. A carriage movable in water comprising:
    a body comprising an upper portion, a middle portion or an abdomen, and a lower portion, said body having a float at its upper portion and a weight at its lower portion to submerge partially said body in the water, the body having an opening in its abdomen;
    a thrust fan mounted on a back of the body, the fan being rotatable in a normal or reverse direction thereby enabling the body to translate in the water and to suctionally attach itself on a wall or leave the wall;
    a skirt provided around the opening formed in the abdomen of the body to contact the wall thereby maintaining the bodies interior to a negative pressure as the body suctionally attaches itself onto the wall; and
    a drive wheel provided on the abdomen of the body to contact the wall upon the suctional attachment onto the wall by said body.

2. The carriage of claim 1 wherein two thrust fans are provided right and left of the back of the body respectively.

3. The carriage of claim 1 wherein two drive wheels are provided at right and left lower portions of the abdomen of the body respectively.

4. The carriage of claim 1 wherein a power supply cable which also serves as a manipulation cable for vertical movement in the water is connected to the body.

5. The carriage of claim 1 wherein a ball caster is provided on the abdomen of the body to assist the drive wheel when the carriage moves on the wall.

6. The carriage of claim 1 wherein the skirt is provided with means for overriding an obstruction on the wall.

* * * * *